United States Patent
Liu

(10) Patent No.: US 10,203,771 B1
(45) Date of Patent: Feb. 12, 2019

(54) FOLDING KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yi-Jun Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/839,866

(22) Filed: Dec. 13, 2017

(51) Int. Cl.
*H01H 13/86* (2006.01)
*G06F 3/02* (2006.01)

(52) U.S. Cl.
CPC ........... *G06F 3/0221* (2013.01); *H01H 13/86* (2013.01); *H01H 2223/052* (2013.01)

(58) Field of Classification Search
CPC ......... H01H 2223/05; H01H 2223/052; H01H 13/86; G06F 3/0221; G10H 2220/256
See application file for complete search history.

(56) References Cited

U.S. PATENT DOCUMENTS

| 5,768,094 A * | 6/1998 | Merkel | G06F 1/1616 361/679.11 |
| 6,174,097 B1 * | 1/2001 | Daniel | G06F 3/0221 400/472 |
| 6,924,788 B2 * | 8/2005 | Hsu | G06F 3/0221 345/168 |
| 2003/0048596 A1 * | 3/2003 | Hsieh | G06F 3/0221 361/679.16 |
| 2004/0066373 A1 * | 4/2004 | Wu | G06F 3/0221 345/168 |

* cited by examiner

*Primary Examiner* — Vanessa Girardi
(74) *Attorney, Agent, or Firm* — ScienBiziP, P.C.

(57) ABSTRACT

A folding keyboard includes a number of keypads, a number of telescopic rods arranged on opposite sides of the number of keypads, and a number of connecting cables for electrically coupling the number of keypads together. The number of keypads are combined into a unified piece by the number of telescopic rods being in a contracted state. The number of keypads are separated from each other by the telescopic rods being in an extended state. The number of keypads separated from each other can be stacked on top of each other.

13 Claims, 8 Drawing Sheets

FOLDING KEYBOARD

CROSS-REFERENCE TO RELATED APPLICATIONS

This application claims priority to Chinese Patent Application No. 201710618775.9 filed on Jul. 26, 2017, the contents of which are incorporated by reference herein.

FIELD

The subject matter herein generally relates to keyboards, and more particularly to a keyboard capable of folding.

BACKGROUND

Many electronic devices can connect to an external keyboard. For portable electronic devices, it is convenient to have a portable keyboard.

BRIEF DESCRIPTION OF THE DRAWINGS

Implementations of the present technology will now be described, by way of example only, with reference to the attached figures.

DETAILED DESCRIPTION

Figure 1:
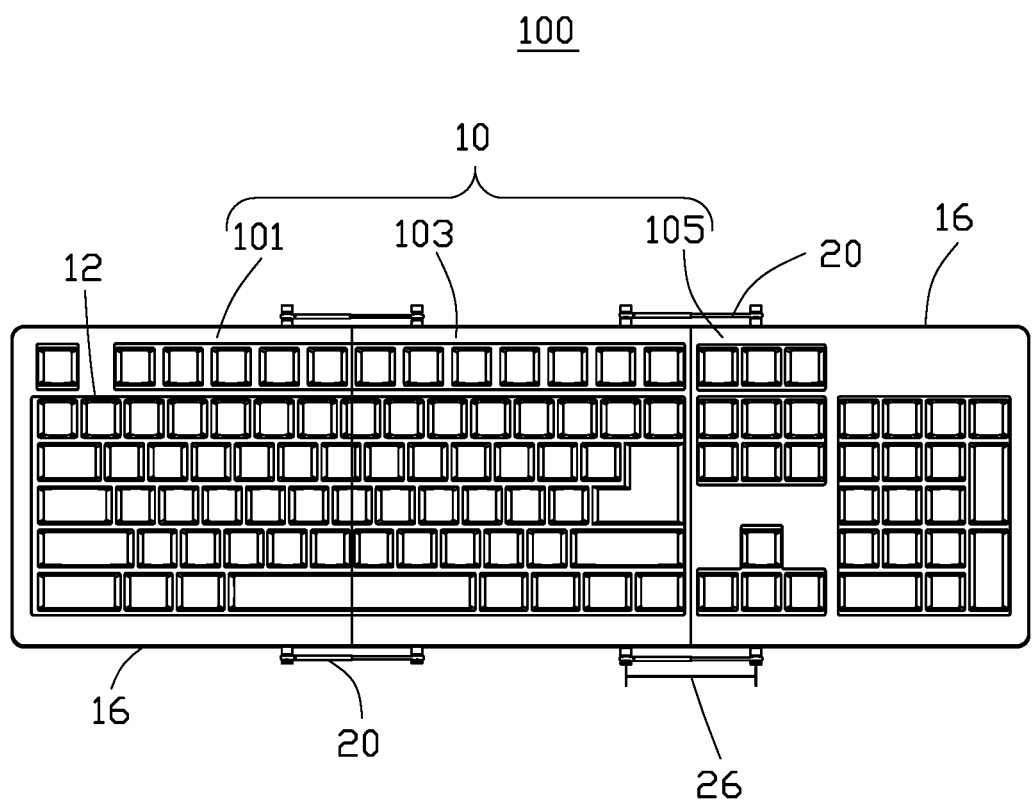
FIG. 1 is an assembled top view of an embodiment of a folding keyboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

Figure 2:
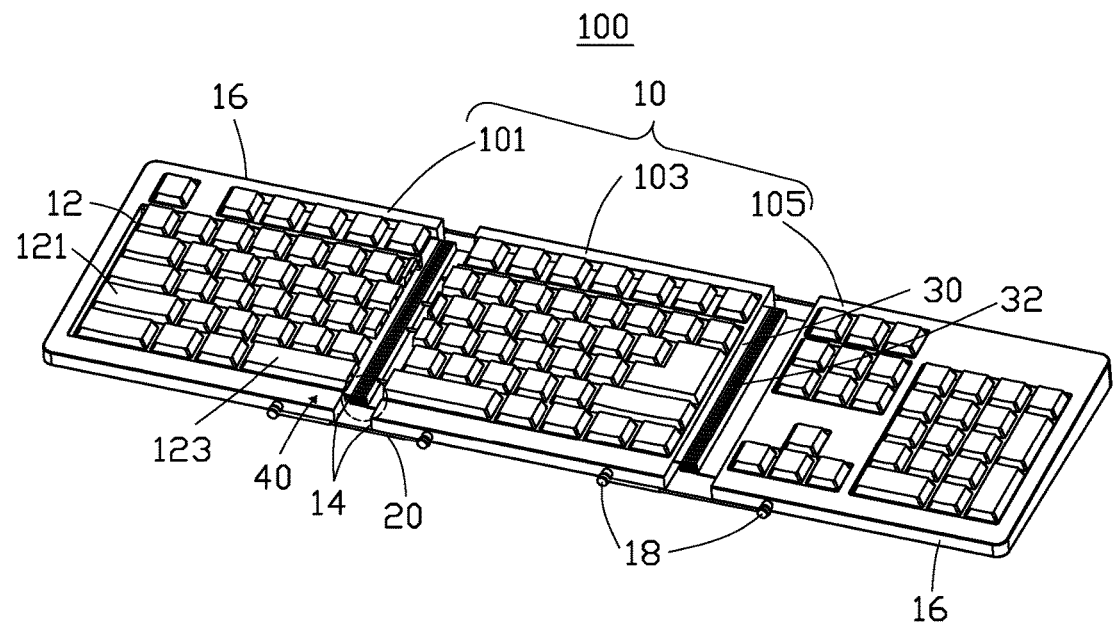
FIG. 2 is a perspective view of the folding keyboard of FIG. 1.

FIG. 1 illustrates an embodiment of a folding keyboard 100. The folding keyboard 100 can include a plurality of keypads 10, a plurality of telescopic rods 20, and a plurality of connecting cables 30 (shown in FIG. 2). Each keypad 10 can have a key area 12 and at least one docking face 14 (as shown in FIG. 2). The key area 12 can be located on an upper surface of the keypad 10 to provide an input interface. The docking faces 14 are located on a side of the keypads 10. Adjacent keypads 10 can be adjoined by the docking faces 14. The telescopic rods 20 are pivotably disposed on opposing front and rear sides 16 of the keypads 10. The connecting cables 30 are arranged at bottom of the key area 12 of the keypads 10 for electrically coupling the keypads 10 together. The connecting cables 30 have a folding portion 32 (shown in FIG. 2) between adjacent keypads 10. The folding portion 32 can be extended or folded, and extension or folding of the folding portion 32 does not affect operation of the key areas 12. The keypads 10 can be combined into a unified piece when the telescopic rods 20 are in a contracted state. The keypads 10 can be stacked on top of each other when the telescopic rods 20 are in an extended state.

Referring to FIG. 2, when the telescopic rods 20 are in the extended state, adjacent keypads 10 are separated from each other at the docking faces 14. The key areas 12 of the keypads 10 have a plurality of keys 121. Because the keys 121 have different sizes and arrangements, when the keypads 10 are separated from each other, some of the keys 121 are split into two pieces. For example, a space key 123 is arranged on two adjacent keypads 10 and includes a first key portion 1231 (shown in FIG. 3) and a second key portion 1233 (shown in FIG. 3). The first key portion 1231 and the second key portion 1233 are located on different adjacent keypads 10.

Figure 3:
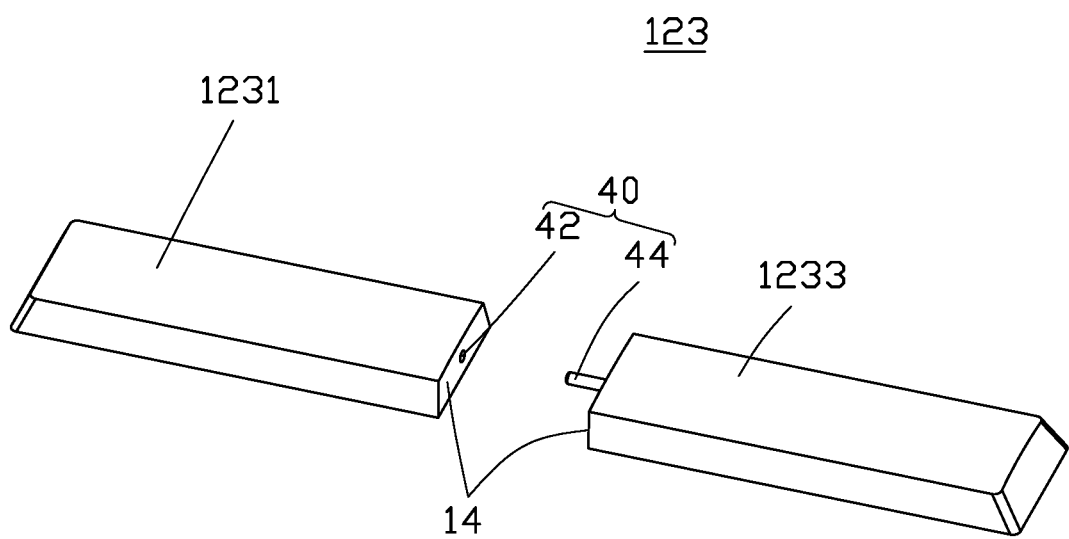
FIG. 3 is a perspective view of a space key of the folding keyboard.
Figure 4:
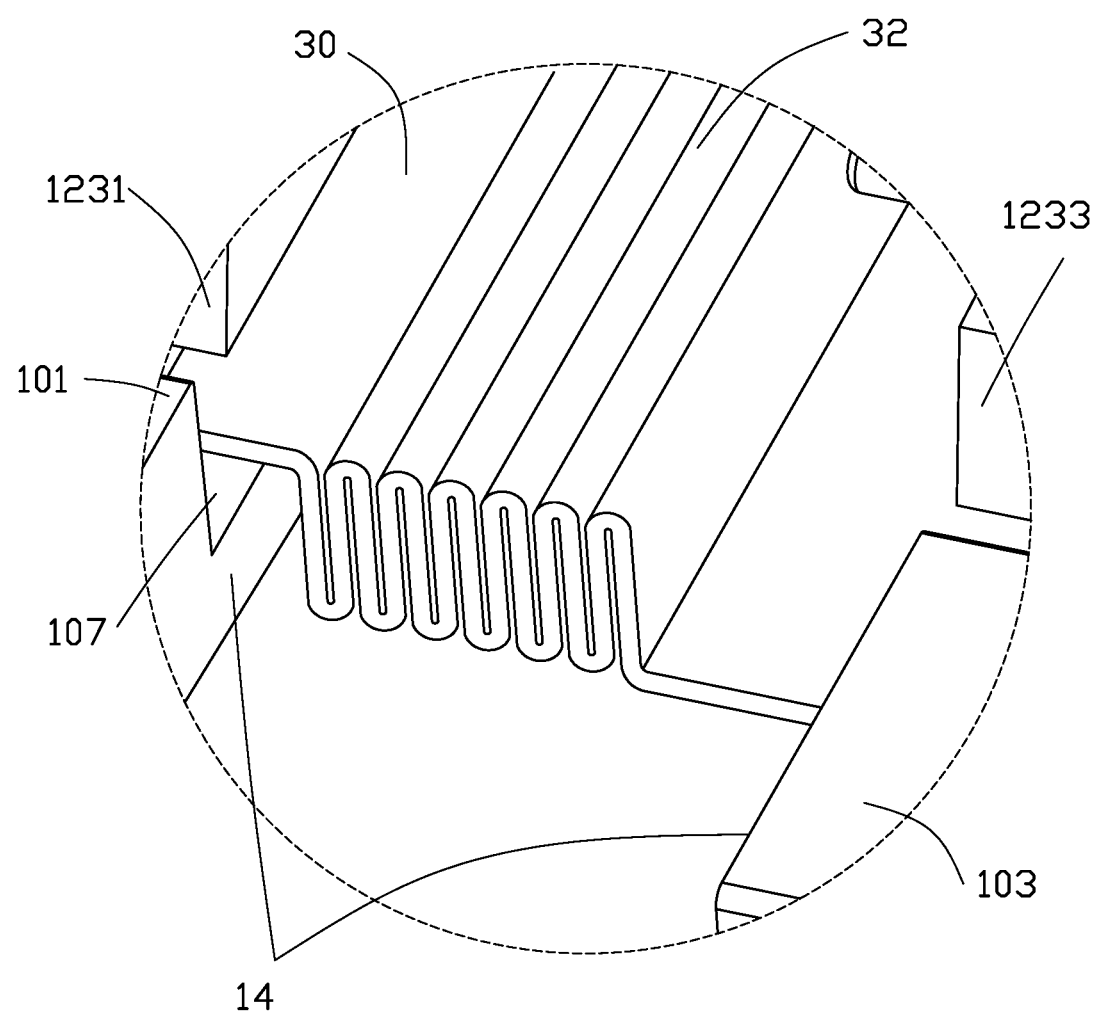
FIG. 4 is an enlarged view of a circled part of FIG. 2.

Referring to FIG. 3, the docking surfaces 14 of adjacent keypads 10 have a coupling assembly 40 through which the first key portion 1231 and the second key portion 1233 can be engaged to form a complete space key 123. The coupling assembly 40 can include a coupling hole 42 and a coupling rod 44. The coupling hole 42 can be defined in the first key portion 1231, and the coupling rod 44 can be arranged on the second key portion 1233. The coupling rod 44 can be inserted into the coupling hole 42 to form the space key 123. In at least one embodiment, the folding keyboard 100 can include a first keypad 101, a second keypad 103, a third keypad 105, and four telescopic rods 20. The first keypad 101 and the third keypad 105 are pivotably coupled to the second keypad 103. A cable groove 107 is defined in bottom of the first keypad 101 and the third keypad 105 (shown in FIG. 4). When the first keypad 101, the second keypad 103, and the third keypad 105 are combined together into one piece, the folding portion 32 of the connecting cables 30 can be received inside the cable grooves 107 so that the first keypad 101, the second keypad 103, and the third keypad 105 are combined seamlessly.

Figure 5:
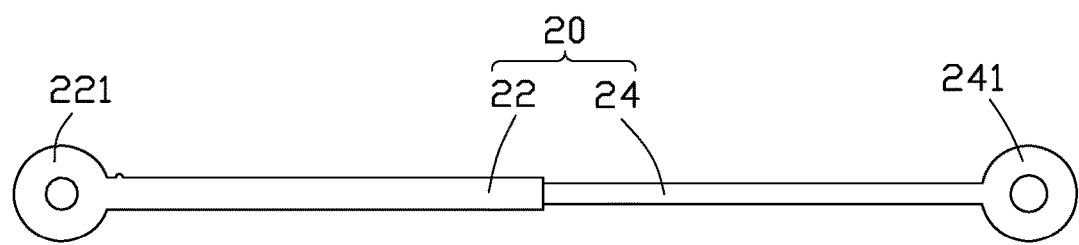
FIG. 5 is a side view of a telescopic rod of FIG. 1.

Referring to FIG. 5, the telescopic rod 20 can include a first tube 22 and a second tube 24. The first tube 22 can include a first pivoting ring 221 located at one end of the first tube 22, and the second tube 24 can include a second pivoting ring 241 located at an end of the second tube 24. An end of the second tube 24 away from the second pivoting ring 241 is inserted into the first tube 22, and extension and contraction of the telescopic rod 20 can be achieved by extension and contraction of the second tube 24 relative to the first tube 22. The first pivoting ring 221 and the second pivoting ring 241 of the telescopic rods 20 are separately arranged on adjacent keypads 10 on the front and rear sides 16. The front and rear sides 16 of the keypad 10 have a plurality of rivets 18. The rivets 18 are pivotably coupled to the first pivoting rings 221 and the second pivoting rings 241

(as shown in FIG. 2). In the present embodiment, the second keypad 103 has two rivets 18 on each of the front and rear sides 16, and the first keypad 101 and the third keypad 105 has one corresponding rivet 18 on each of the front and rear sides 16 adjacent to the second keypad 103. The telescopic rods 20 pivotably couple the second keypad 103 between the first keypad 101 and the third keypad 105. The first pivoting ring 221 and the second pivoting ring 241 of the telescopic rods 20 are separately pivotably coupled to the rivets 18 on the adjacent keypads 10 to pivotably couple the keypads 10 together.

Figure 6:
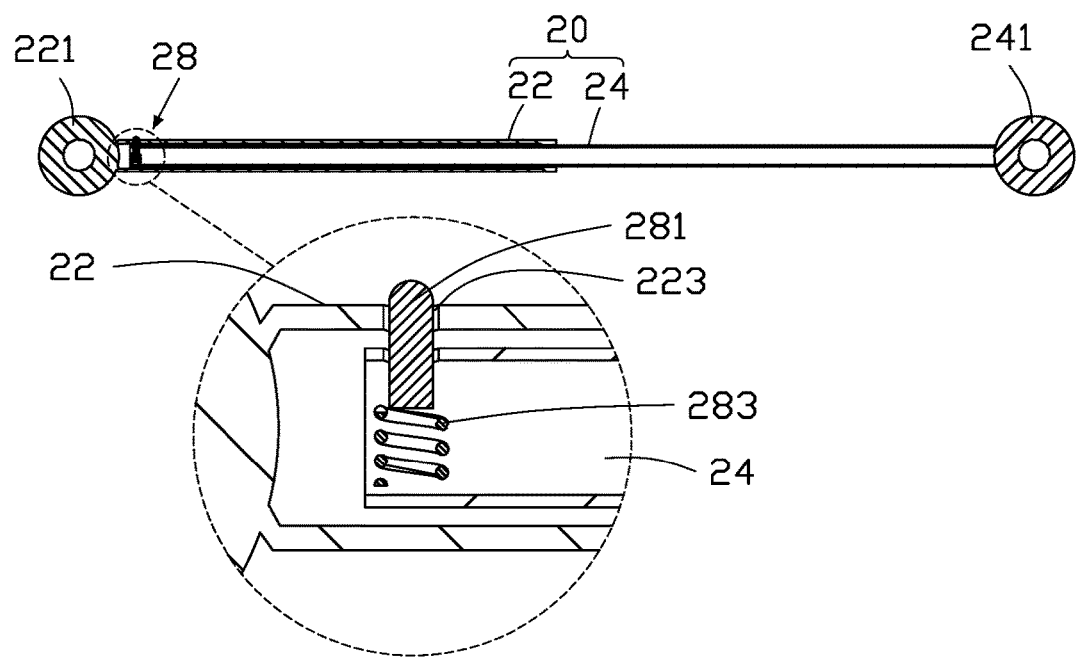
FIG. 6 is a cross-sectional view of the telescopic rod of FIG. 5 in a contracted state.

Referring to FIG. 6, an inner diameter of the first tube 22 is larger than an outer diameter of the second tube 24. A latching hole 223 is defined in the first tube 22 adjacent to the first pivoting ring 221, and a limiting step 225 (shown in FIG. 7) protrudes from an inner surface of the first tube 22 at an end portion of the first tube 22 away from the pivoting ring 221. A length of the second tube 24 is longer than a length of the first tube 22. A length between the first limiting ring 221 and the second limiting ring 241 defines a distance 26 (as shown in FIG. 1).

The second tube 24 can include a latching assembly 28. The latching assembly 28 can be located inside the second tube 24 at an end portion of the second tube 24 away from the second pivoting ring 241. The latching assembly 28 can include a resilient member 283 fixed to an inner surface of the second tube 24 and a latch 281 affixed to the resilient member 283. The latch 281 can protrude out of the second tube 24. In at least one embodiment, the resilient member 283 is a spring. When the telescopic rod 20 is in the retracted state, the latch 281 can be biased by the resilient member 283 to insert into the latching hole 223 of the first tube 22 so that the telescopic rod 20 is held in the retracted state (as shown in the enlarged view of FIG. 6).

Figure 7:
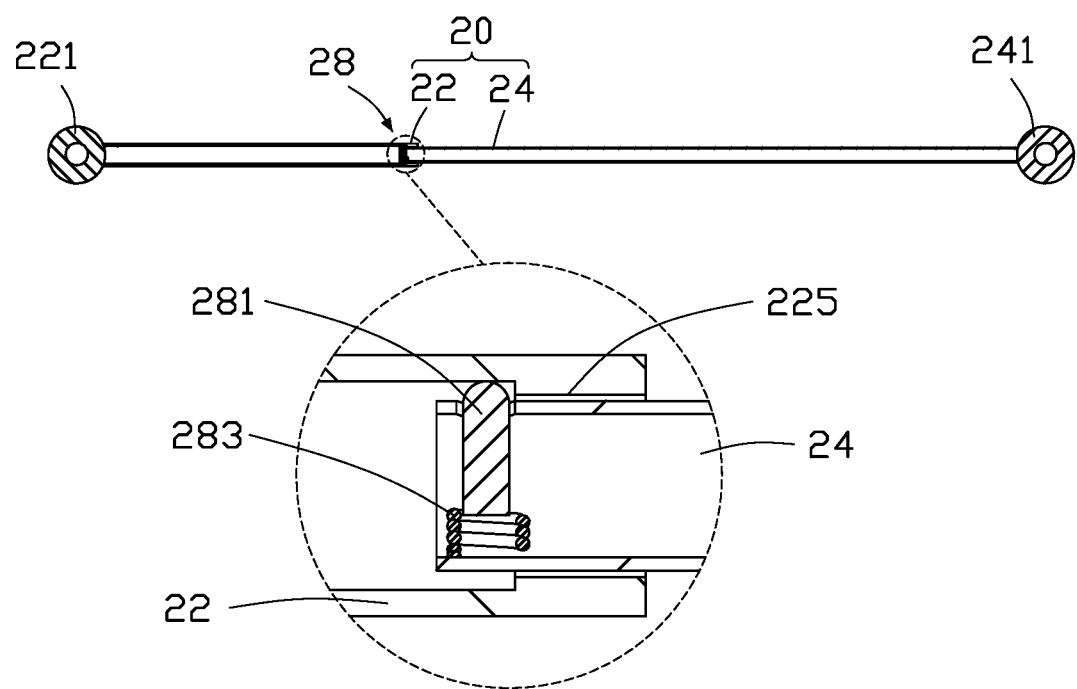
FIG. 7 is a cross-sectional view of the telescopic rod of FIG. 5 in an extended state.

Referring to FIG. 7, when the latch 281 is pressed into the second tube 24, the latching assembly 28 can be disengaged from the latching hole 223 so that the second tube 24 can be displaced relative to the first tube 22. When the second tube 24 is displaced relative to the first tube 22, the telescopic rod 20 can be telescopically operated to switch to the extended state. When the telescopic rod 20 is switched to the extended state, the latch 281 of the second tube 24 continues to protrude out of the second tube 24, and the limiting step 225 of the first sleeve 22 can limit the latch 281 from moving past the limiting step 225, thereby preventing the second tube 24 from disengaging from the first tube 22 (shown in the enlarged view of FIG. 7). The telescopic rods 20 in the extended state can allow the first keypad 101 and the third keypad 105 to separate from the second keypad 103, and the limiting steps 225 can prevent the first keypad 101 and the third keypad 105 from disengaging from the second keypad 103.

Figure 8:
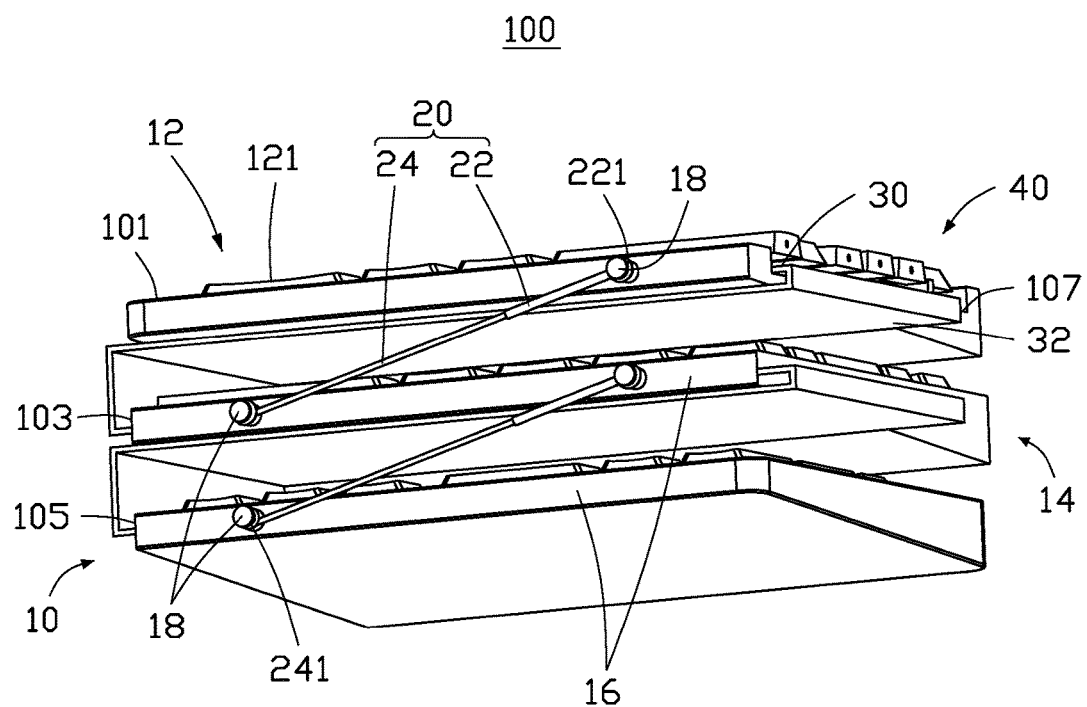
FIG. 8 is a perspective view of the folding keyboard in another state of use.

Referring to FIG. 8, when the first keypad 101 and the third keypad 105 are separated from the second keypad 103 at the docking faces 14, the folding portions 32 of the connecting cables 30 can be extended. After the folding portions 32 are extended, the first keypad 101 can be pivotably moved to stack on top of the second keypad 103, and the third keypad 105 can be pivotably moved to be stacked under the second keypad 103. Thus, the folding keyboard 100 can be reduced in size by stacking the first keypad 101, the second keypad 103, and the third keypad 105. To use the folding keyboard 100, the first keypad 101 and the third keypad 105 can be pivoted to make the docking faces 14 face each other, and the telescopic rods 20 can be contracted to assemble the plurality of keypads together. The connecting cables 30 can be folded at the folding portions 32 and received in the cable grooves 107.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A folding keyboard comprising:
   a plurality of keypads;
   a plurality of telescopic rods arranged on opposite sides of the plurality of keypads; and
   a plurality of connecting cables for electrically coupling the plurality of keypads together;
   wherein the plurality of keypads are combined into a unified piece by the plurality of telescopic rods being in a contracted state;
   wherein the plurality of keypads are separated from each other by the telescopic rods being in an extended state;
   wherein the plurality of keypads separated from each other can be stacked on top of each other.

2. The folding keyboard of claim 1, wherein each keypad has a key area comprising a plurality of keys, the key area is arranged on a top surface of the keypad, and the plurality of connecting cables are arranged at bottom of the key area.

3. The folding keyboard of claim 2, wherein at least one of the plurality of keys is arranged on two adjacent keypads and comprises a first key portion and a second key portion, the first key portion and the second key portion each is arranged on separate keypad; each keypad has a docking face arranged on a side of the keypad and facing the docking face of the adjacent keypad, the docking faces of adjacent keypads comprise a coupling assembly for adjoining the first key portion and the second key portion.

4. The folding keyboard of claim 3, wherein the plurality of keypads comprises a first keypad, a second keypad, and a third keypad; the number of the telescopic rods is four; the second keypad is coupled between the first keypad and the third keypad; the four telescopic rods pivotably couple the second keypad between the first keypad and the third keypad, two telescopic rods being arranged on a front side of the plurality of keypads, and two telescopic rods being arranged on a back side of the plurality of keypads.

5. The folding keyboard of claim 4, wherein the connecting cables electrically couple the first keypad, the second keypad, and the third keypad together; the connecting cables comprise a folding portion on both sides of the second keypad; the folding portion unfolds when the first keypad, the second keypad, and the third keypad are stacked on each other; a cable groove is defined in bottom of the first keypad and the third keypad for receiving the folding portions therein when the telescopic rods are in the contracted state.

6. The folding keyboard of claim 5, wherein the telescopic rod comprises a first tube and a second tube inserted into the first tube; the first tube comprises a first pivoting ring at an end away from the second tube, and the second tube comprises a second pivoting ring at an end away from the first tube.

7. The folding keyboard of claim 6, wherein each of the first keypad, the second keypad, and the third keypad comprises a plurality of rivets arranged on the front and back side; the first pivoting ring and the second pivoting ring are pivotably secured on rivets of the adjacent keypads to pivotably couple the adjacent keypads together.

8. The folding keyboard of claim 7, wherein an inner circumference of the first tube is larger than an outer circumference of the second tube.

9. The folding keyboard of claim 8, wherein a length of the second tube is longer than a length of the first tube; a distance is defined between the first pivoting ring and the second pivoting ring.

10. The folding keyboard of claim 9, wherein the second tube comprises a latching assembly located inside the second tube at an end portion away from the second pivoting ring; a latching hole is defined in the first tube adjacent to the first pivoting ring; the latching assembly latches in the latching hole when the telescopic rod is in the contracted state to hold the telescopic rod in the contracted state.

11. The folding keyboard of claim 10, wherein the latching assembly comprises a latch and a resilient member; the resilient member is fixed inside the second tube to an inner surface of the second tube; the latch is affixed to the resilient member and protrudes out of the second tube; the latch is biased by the resilient member to insert into the latching hole of the first tube when the latching hole is aligned with the latch.

12. The folding keyboard of claim 11, wherein the latch is disengaged from the latching hole by pressing the latch into the second tube; the telescopic rod is switched to the extended state from the contracted state when the latch is disengaged from the latching hole.

13. The folding keyboard of claim 12, wherein the first tube comprises a limiting step at an end portion of the first tube away from the first pivoting ring, the limiting step protrudes from an inner surface of the first tube; the limiting step limits extension of the telescopic rod by blocking the latch from moving past the limiting step, thereby preventing the second tube from disengaging from the first tube.

\* \* \* \* \*

UNITED STATES PATENT AND TRADEMARK OFFICE
CERTIFICATE OF CORRECTION

Page 1 of 1

PATENT NO. : 10,203,771 B1
APPLICATION NO. : 15/839866
DATED : February 12, 2019
INVENTOR(S) : Yi-Jun Liu It is certified that error appears in the above-identified patent and that said Letters Patent is hereby corrected as shown below:

On the Title Page

Please add Item (30) regarding "Foreign Application Priority Data" with the following:
(30) Foreign Application Priority Data
July 26 (CN)..................201710618775.9

Signed and Sealed this
Twenty-fifth Day of June, 2019

Andrei Iancu
*Director of the United States Patent and Trademark Office*